(12) United States Patent
Iyer et al.

(10) Patent No.: US 8,065,484 B2
(45) Date of Patent: Nov. 22, 2011

(54) ENHANCED ACCESS TO DATA AVAILABLE IN A CACHE

(75) Inventors: Shankar Iyer, Bangalore (IN); Krishna Mohan Venkata Itikarlapalli, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 672 days.

(21) Appl. No.: 11/849,311

(22) Filed: Sep. 3, 2007

(65) Prior Publication Data
US 2009/0024794 A1    Jan. 22, 2009

(30) Foreign Application Priority Data

Jul. 19, 2007    (IN) .......................... 1566/CHE/2007

(51) Int. Cl.
*G06F 12/00*    (2006.01)
(52) U.S. Cl. ........................ 711/118; 709/219
(58) Field of Classification Search ................ 711/129, 711/163, 118; 709/215, 219
See application file for complete search history.

(56) References Cited

U.S. PATENT DOCUMENTS

| | | | |
|---|---|---|---|
| 6,453,321 B1 * | 9/2002 | Hill et al. ................... | 707/103 Y |
| 6,678,791 B1 * | 1/2004 | Jacobs et al. ................. | 711/118 |
| 7,080,158 B1 * | 7/2006 | Squire .......................... | 709/245 |
| 2001/0047477 A1 * | 11/2001 | Chiang ......................... | 713/170 |
| 2004/0236777 A1 * | 11/2004 | Pardikar et al. ............... | 707/100 |
| 2006/0167975 A1 * | 7/2006 | Chan et al. .................... | 709/203 |

OTHER PUBLICATIONS

"C++ and STL: Take Advantage of STL Algorithms by Implementing a Custom Iterator" by Samir Bajaj, http://msdn.microsoft.com/msdnmag/issues/01/04/STL/, Apr. 2001. pp. 1-5.
"Using the Wordpress Object Cache" by Dougal, http://dougal.gunters.org/blog/2006/07/21/using-the-wordpress-object-cache, Jul. 2006, pp. 1-5.
"Pattern: View Cache", http://www.objectarchitects.de/ObjectArchitects/orpatterns/TupleLayer/ViewCache/, Downloaded circa: Aug. 2007, pp. 1-3.
"Oracle® C++ Call Interface Programmer'S Guide 10G Release 2 (10.2) 4 Object Programming", http://download-east.oracle.com/docs/cd/B19306_01/appdev.102/b14294/objects.htm#sthref346, 2005, pp. 1-34.
"Oracle® Call Interface Programmer'S Guide,10G Release 2 (10.2) 13 Object Advanced Topics in OCI", http://download-east.oracle.com/docs/cd/B19306_01/appdev.102/b14250/oci13oca.htm#i443693, 2005, pp. 1-15.

* cited by examiner

*Primary Examiner* — Jared Rutz
(74) *Attorney, Agent, or Firm* — Narendra Reddy Thappeta (57) ABSTRACT

Enhanced access data available in a cache. In one embodiment, a cache maintaining copies of source data is formed as a volatile memory. On receiving a request directed to the cache for a copy of a data element, the requested copy maintained in the cache is sent as a response to the request. In another embodiment used in the context of applications accessing databases in a navigational model, a cache maintains rows of data accessed by different user applications on corresponding connections. Applications may send requests directed to the cache to retrieve copies of the rows, populated potentially by other applications, while the cache restricts access to rows populated by other applications when processing requests directed to the source database system. In another embodiment, an application may direct requests to retrieve data elements caused to be populated by activity on different connections established by the same application.

25 Claims, 8 Drawing Sheets

531: Statement *stmt = conn1->createStatement("select ref(a) from car a where a.cyear = '1994'");
532: ResultSet *rs = stmt->executeQuery();

533: while (rs->next()) {
534:     Ref <Car> r1 = rs->getRef(1);
535:     cout << r1->getCModel() << endl;
536:     cout << r1->getCEngRef()->getEPower() << endl;
537:     cout << r1->getCMfgRef()->getMName() << endl;
538: }

*FIG. 5A*

561: Statement *stmt = conn2->createStatement("select ref(a) from manufacturer a where a.mcity = 'London'");
562: ResultSet *rs = stmt->executeQuery();

563: while (rs->next()) {
564:     Ref<Manufacturer> r1 = rs->getRef(1);
565:     cout << r1->getMName() << endl;
566: }

661: CacheIterator c1(conn, "manufacturers");

662: while (c1 != c1.end()) {
663:     Manufacturer mfgr = *c1;
664:     if (mfgr.getMCity() == "London"){
665:         cout << mfgr.getMName() << endl;
666:     }
667:     c1++;
668: }

ENHANCED ACCESS TO DATA AVAILABLE IN A CACHE

RELATED APPLICATION

The present application is related to and claims priority from the co-pending India Patent Application entitled, "ENHANCED ACCESS TO DATA AVAILABLE IN A CACHE", Serial Number: 1566/CHE/2007, Filed: Jul. 19, 2007, naming the same inventors Shankar Iyer and Krishna Mohan as in the subject patent application, and is incorporated in its entirety herewith.

BACKGROUND

1. Technical Field

The present disclosure relates to caching technologies and more specifically to providing enhanced access to data available in a cache.

2. Related Art

A cache generally refers to a storage, which stores a copy of the data, usually closer to the accessing system/component than a remote source that stores the original data. Such storing in a cache facilitates the accessing system/component to quickly access data of interest. Caches may be implemented in volatile memories (e.g., random access memory) or on a secondary storage (e.g., hard disk).

In one scenario, an access logic contained in a cache intercepts a request (for a data) directed to a remote source and then inspects a buffer (also contained in the cache) to determine whether a copy of the data requested exists in the cache. In a scenario that a copy of the data exists in the buffer, the copy is used to send a response to the request. If the copy does not exist in the cache, the request is forwarded to the remote source. The access logic may then update the buffer with the copy of the data received as a response to the request, thereby building up the cache.

It is generally desirable to enhance access to data available in a cache.

BRIEF DESCRIPTION OF THE DRAWINGS

Example embodiments of the present invention will be described with reference to the accompanying drawings briefly described below.

Each of FIGS. 5A and 5B depicts a portion of software code, which on execution accesses data from a source system thereby populating the cache in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention enables enhanced access to data available in a cache. In an embodiment, a cache maintaining copies of source data is formed as a volatile memory. On receiving a request directed to the cache for a copy of a data element, the requested copy maintained in the cache is sent as a response to the request.

A request is said to be 'directed to' a target when the signals associated with the request indicate that the data is to be retrieved from the target. The associated signals may be designed according to any of various conventions. In one convention, the address (e.g., Internet Protocol address) of the target is specified in a packet containing the request. In another convention, some pre-specified paths (bus signals) may be asserted to specify the target. In the example embodiments described in sections below, each request expressly specifies either the source (at which data is stored) or the cache (maintaining a copy of data elements) as the target.

Thus, additional requests directed to the source system for the same data element may also be received. In such a case, the cache may send the same copy of the data element maintained in the cache as the response to an additional request.

Another aspect of the present invention permits each user application to retrieve data elements caused to be stored by other user applications by directing the access requests to the cache, but yet restricts access of each user application to only those data elements caused to be stored by the corresponding user application with respect to access requests directed to the respect source system.

More aspects of the present invention are directed to a navigational model used in retrieving data from a database server. A navigational model refers to an approach in which a database server is designed to send reference identifiers identifying the data (e.g., rows in case of relational databases) matching a query, and the issuer of the query may then use the reference identifiers to request the corresponding data elements (rows). When supporting such an environment, a cache may store the reference identifiers (associated with the data elements) to permit the copies of corresponding data elements (rows) to be provided using the cache when the requests specify reference identifiers.

One more aspect of the present invention in such an environment permits an application to send requests directed to a cache to cause retrieval of any data element populated due to requests on any connection established by the same application to the database server supporting navigational model. On the other hand, in response to requests directed to a source system on a connection, the cache permits copy of a data element to be provided as a response only if the data element is populated based on activity on the same connection earlier.

Yet another aspect of the present invention permits sequential retrieval of all data elements of interest in a cache. In one embodiment, on receiving a request for accessing data elements of interest, a copy of a first data element in the requested data elements of interest is sent as a response. On receiving further requests for the next data element of interest, the copies of the next data elements requested are sent as corresponding responses. After all the requested data elements of interest have been accessed, a corresponding indication is sent as a response to the next request. An application may optionally specify that only the data elements populated due to activity on specific connections are of interest.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
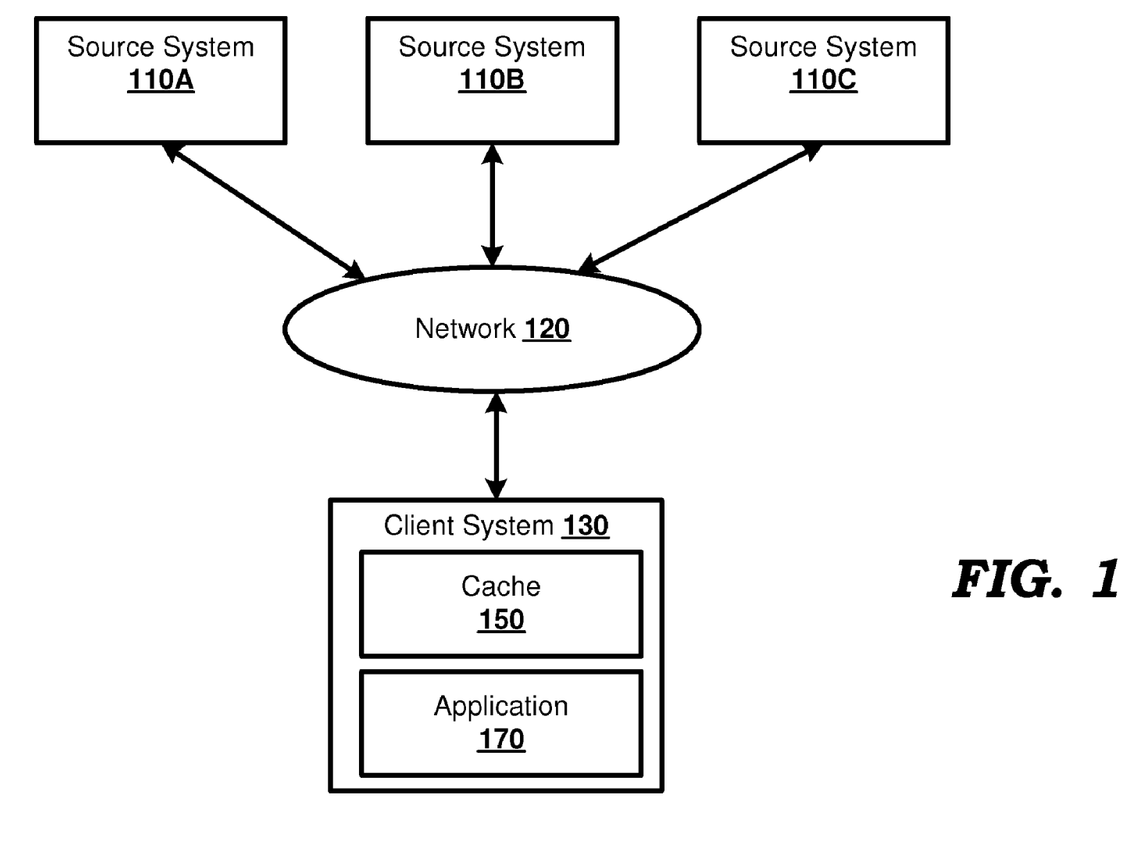
FIG. 1 is a block diagram illustrating an example computing system in which various aspects of the present invention can be implemented.

FIG. 1 is a block diagram illustrating an example computing system in which various aspects of the present invention can be implemented. The block diagram is shown containing source systems 110A-110C, network 120, and client system 130 (containing cache 150 and application 170).

Merely for illustration, only representative number/type of systems are shown in the Figure. Many environments often contain many more systems, both in number and type, depending on the purpose for which the environment is designed. Each system/device of FIG. 1 is described below in further detail.

Network 120 provides connectivity between various source systems 110A-110C, and client system 130. Network 120 may be implemented using protocols such as Internet Protocol (IP) well known in the relevant arts.

Each of source systems 110A-110C represents a server, such as an application server/web server, executing software programs capable of performing operations (for example, an operation specifying access of data of interest) requested by client system 130. Alternatively, a source system may represent a database server, which facilitates storage and retrieval of data using structured queries such as SQL in the case of relational database technologies. In general, a source system provides original data (which can be any content, e.g., web page content, software code, etc.) that is accessed via caches according to several aspects of the present invention.

Client system 130 represents a system such as a personal computer, workstation, mobile station, etc., and is used by a user to generate requests to any of source systems 110A-110C. The requests may be generated according to a suitable interface. It may be appreciated that client system 130 may contain software programs such as operating system, device drivers, etc., (not shown) that provide a run time environment in which cache 150 and application 170 are executed. In general, the run time environment provides a base on which many user applications can potentially be executed.

Application 170 represents a software program (or a portion thereof) executing in a run time environment of client system 130. On execution, application 170 may send requests for accessing data of interest directed to a source system (for example, one of source systems 110A-110C) and receive corresponding responses containing the requested data.

Cache 150 maintains copies of data (in a memory in client system 130) closer to the accessing system/component (such as application 170) than a remote source (such as one of source systems 110A-110C) that stores the original data. As such, cache 150 facilitates application 170 to quickly access the data of interest. Though shown within the same system as in which application 170 is implemented, caches may be implemented external to such systems (e.g., as an individual system/unit external to client system 130) in alternative embodiments according to some aspects of the present invention.

Cache 150 may intercept (i.e., examine, though not directed to the cache) requests for accessing data of interest from application 170 directed to a source system (such as one of source systems 110A-110C) and then determine whether the requested data of interest is contained in the maintained copies of data.

In the scenario that the maintained copies of data includes the requested data, the copies of the data of interest is sent as a response to the request by cache 150. Alternatively, the request may be forwarded (either by cache 150 or otherwise by default) to the source system. On receiving a response from the source system, cache 150 may store a copy of the data of interest included in the response.

In one prior approach, a cache performs transparently with respect to applications, that is, each application is not made aware of the existence of the cache. As such, applications may not be able to send requests directed to cache.

An aspect of the present invention enables an accessing system/component (such as application 170) to directly access the copies of data maintained in cache 150 as described below with examples.

3. Providing Access to Copies of Data

Figure 2:
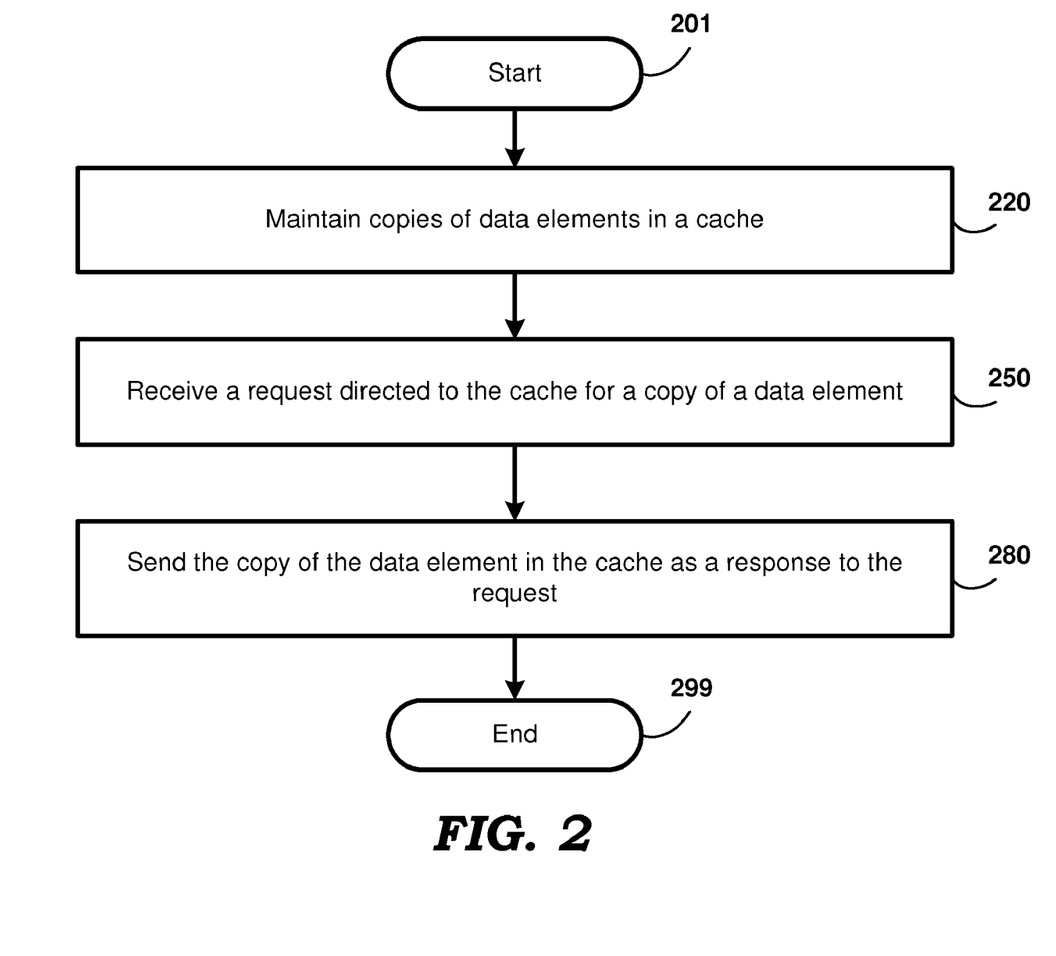
FIG. 2 is a flowchart illustrating the manner in which access to copies of data stored in a cache is provided according to an aspect of the present invention.

FIG. 2 is a flowchart illustrating the manner in which access to copies of data stored in a cache is provided according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 220.

In step 220, copies of data elements are maintained in cache 150. Maintaining implies that the data elements are stored and removed later if needed, accordingly to any desired approach. The data elements may be received in response to requests directed to a source system (such as one of source systems 110A-110C). However, cache 150 can be populated (stored) using other techniques, and quick access can be provided to application 170.

In step 250, cache 150 receives a request for a copy of a data element directed to the cache. As noted above, 'directed to' implies that the signals associated with the request indicate that the data is to be retrieved from cache 150. The request may be received from application 170 and may specify a desired data element according to a pre-specified convention.

In step 280, cache 150 sends the copy of the data element (maintained in cache 150) as a response to the request (to application 170). In the scenario that the requested copy of the data element is not available, cache 150 may send a response indicating the absence of the copy of the data element in cache 150. The flow chart ends in step 299.

Thus, cache 150 provides enhanced access to data (copies of data elements) available in the cache for accessing systems/components such as application 170.

The features described above can be implemented in various environments. In an embodiment, some of the features are implemented in a navigational model of a database. Accordingly, the details of a corresponding example embodiment are described below.

4. Navigational Model

Figure 3:
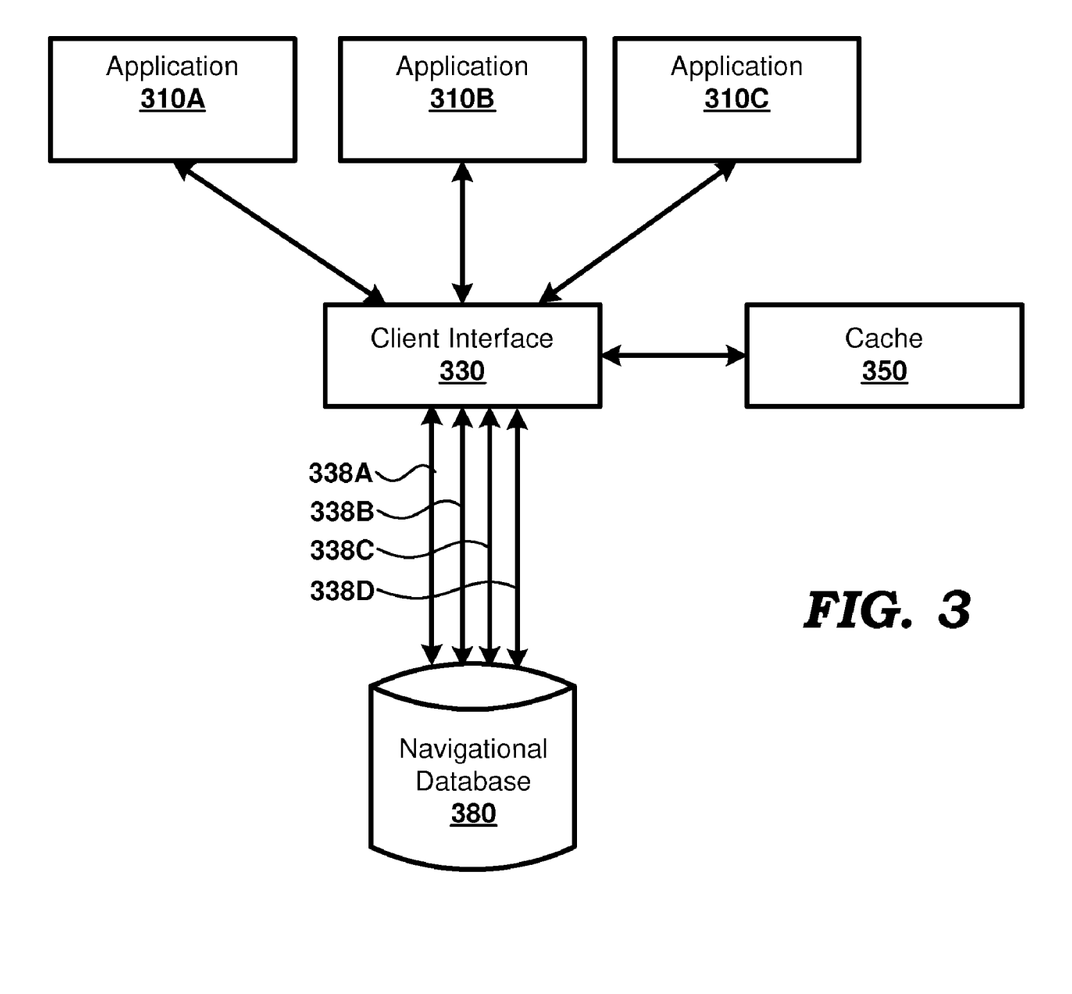
FIG. 3 is a block diagram illustrating an example database environment in which several aspects of the present invention are implemented.

FIG. 3 is a block diagram illustrating an example database environment in which several aspects of the present invention are implemented. The block diagram is shown containing applications 310A-310C, client interface 330, cache 350, and navigational database 380. Each of the blocks is described in detail below.

Each of applications 310A-310C represents a software program, which on execution sends request for accessing data of interest to a source system (such as navigational database 380 where the original data is stored). Each application 310A-310C may be executed in the run time environment of client system 130, and as such any one of applications 310A-310C may represent application 170 of FIG. 1. Alternatively, each application may be executed on a system external to another system implementing client interface 330 and cache 350.

Navigational database 380 represents a database server, which supports a navigational model and stores original data (and thus constitutes a source system such as one of source systems 110A-110C). As noted above, a navigational model (described in more detail in a book entitled, "C++ Object Databases" by David Jordan with ISBN number 0201634880) refers to an approach in which a database server is designed to send reference identifiers identifying the data (e.g., rows in case of relational databases) matching a query, and the issuer of the query may then use the reference identifiers to request the corresponding data elements (rows). In one embodiment, navigational database 380 is implemented using Oracle Database Server available from Oracle Corporation.

Thus, application 310A (or any one of other applications 310B-310C) sends a request containing a query to navigational database 380. The query may specify conditions indicating the data of interest and also may indicate that only the reference identifiers of the rows matching the conditions be included in the response to the query. As such, navigational database performs the query on the stored original data and retrieves the reference identifiers of the rows matching the query. The set of reference identifiers are then sent as a response to application 310A.

On receiving the set of reference identifiers, application 310A may then send further requests to navigational database 380 for the data contained in each of the rows identified by the reference identifiers. Navigational database 380 may then retrieve the rows identified by the reference identifiers and send the retrieved rows (containing the requested data elements) as corresponding responses to application 310A.

Client interface 330 enables each application 310A-310C to send multiple requests to navigational database 380 for accessing data elements of interest. Client interface 330 then causes the requested data elements to be provided based on copy of the elements provided in cache 350 or the original data in navigational database 380 as described below with examples. Each of the requests can be either directed to navigational database 380 or cache 350, as also described below with examples.

In one embodiment, each application first requests client interface 330 to establish a connection with navigational database 380 by providing authentication information (including information about the location of the server and the manner in which connection is to be established). After successful authentication, client interface 330 may send a response to the application indicating that the application may send the requests containing the queries or the reference identifiers as described above.

Each of lines 338A-338D represents a logical connection established between client interface 330 and navigational database 380. It may be appreciated that though a single application may establish and use multiple connections, multiple applications may not be able to share the same connection in one embodiment. For illustration, it is assumed that 338A and 338B are established/used by application 310A, and connections 338C and 338D are respectively established/used by applications 310B and 310C.

Client interface 330 on receiving a request directed to navigational database 380 from one of applications 310A-310C, and checks whether the requested data elements are available in cache 350. If the data elements are available, a response is generated based on the copy in cache 350, and sent to the requesting application. The response may be generated by cache 350 or by client interface 330 (before being sent to the requesting application).

In the scenario that the data elements are not available in cache 350, client interface 330 may forward the request from the application to navigational database 380 using one of logical connections 338A-338D (as specified in the request). On receiving a response from navigation database 380 (containing the requested data of interest), client interface 330 may forward the response to the requesting application and also to cache 350 to enable the cache to maintain copies of the data of interest.

Cache 350 maintains copies of data (for example, in a memory in client system 130) closer to the accessing system/component (one of applications 310A-310C) than a remote source system that stores the original data. As such, cache 350 facilitates applications 310A-310C to quickly access the data of interest.

Cache 350 often maintains the copies of data elements as different partitions often to provide security or for ease of management otherwise. In an embodiment, the data elements in each partition are populated in cache 350 due to activity on (i.e., requests received on) the corresponding connection. When a request directed to navigational database 380 is intercepted, the copy of the data element in a partition of cache 350 is used only if the request is received on the same connection corresponding to the partition.

In the illustrative example noted above, if data elements in a partition are populated due to activity on connection 338A, the copy of the data elements in cache 350 is not used when requests are received on connection 338B (from same application 310A).

As noted above, an aspect of the present invention enables an application to retrieve data elements populated due to activity on all connections established by the application. Thus, application 310A may retrieve data elements in partitions populated due to activity on 338A and 338B by sending requests directed to cache 350 as described below with examples.

The operation of such features is described assuming a sample source data in an example scenario.

5. Sample Source Data

Figure 4:
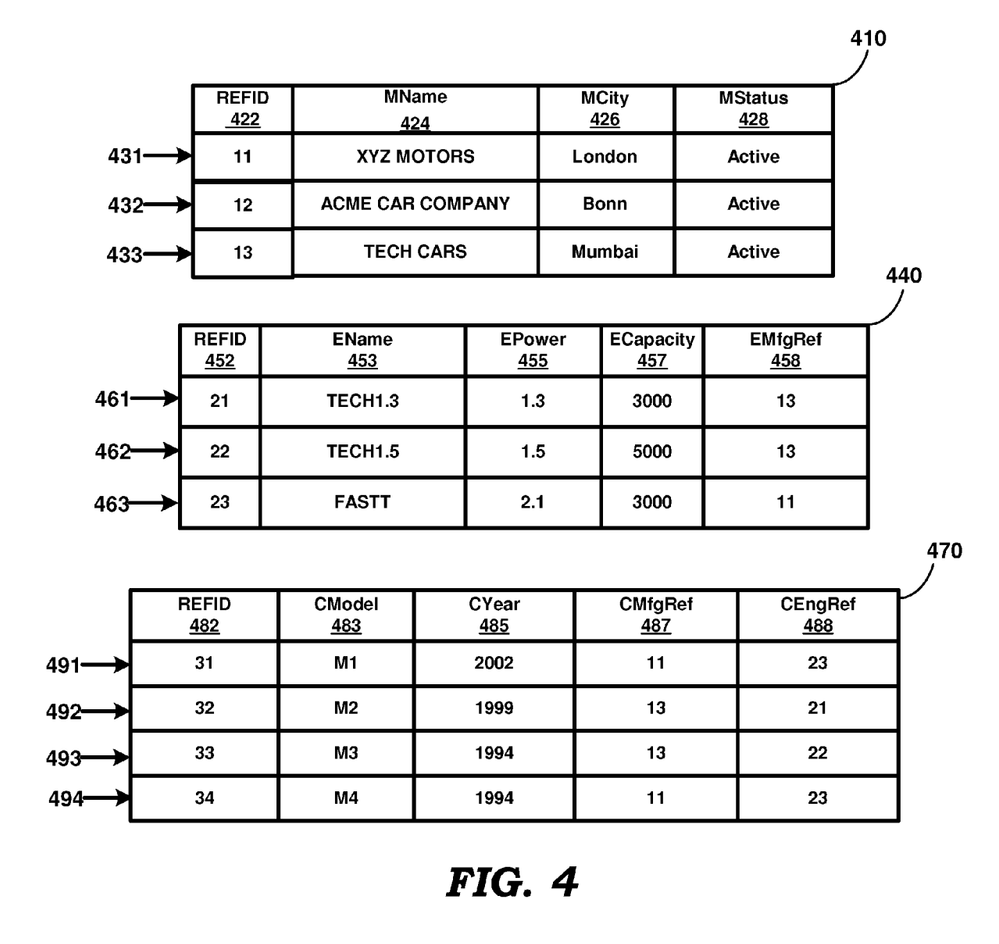
FIG. 4 depicts sample data (source data) desired to be accessed stored in the form of tables in a database in one embodiment.

FIG. 4 depicts sample data (source data) desired to be accessed stored in the form of tables in a database in one embodiment. The data may be stored in navigational database 480.

Broadly, the sample data (shown in tables 410, 440 and 470) depict information about different cars such as the model of the cars, the manufacturer details, the engine details etc. It may be observed that for convenience each of the rows in the tables is associated with a reference identifier ("REFID") uniquely identifying the row in the database. The reference identifiers may enable each application 310A-310C to request for specific rows of the database containing the data of interest.

Table 410 depicts information relating to manufacturers of cars. Column 422 (labeled "REFID") specifies the unique reference identifier for each of the manufacturers. Columns 424 (labeled "MName"), 426 (labeled "MCity") 428 (labeled "MStatus") specify the name, the city or location and the status corresponding to each of the manufacturers.

Each of rows 431-433 specifies information about a manufacturer of cars. In particular, row 431 specifies a manufacturer with name "XYZ MOTORS" (as shown in column 424) located in the city of "LONDON" (as shown in column 426) whose status is "Active" (as shown in column 428) and having a reference identifier "11" (as shown in column 422). Similarly other rows specify information about other manufacturers of cars.

Table 440 depicts information relating to engines used in cars. Column 452 (labeled "REFID") specifies the unique reference identifier for each of the engines. Columns 453 (labeled "EName"), 455 (labeled "EPower") 457 (labeled "ECapacity") specify the name, the power and the capacity corresponding to each of the engines. Column 458 (labeled "EMfgRef") indicates the manufacturer of the engine by specifying the reference identifier of the corresponding manufacturer.

Each of rows 461-463 specifies information about an engine used in cars. In particular, row 461 specifies an engine with name "TECH1.3" (as shown in column 453), a power of "1.3" (as shown in column 455), a capacity of "30000" (as shown in column 457) and having a reference identifier "21" (as shown in column 452). The engine in row 461 is manufactured by the manufacturer with name "TECH CARS", since column 458 contains the manufacturer reference identifier "13" indicating that the manufacturer details are provided in a row in the database having "REFID" equal to "13" (as shown in row 433). Similarly other rows specify information about other engines used in cars.

Table 470 depicts information relating to cars. Column 482 (labeled "REFID") specifies the unique reference identifier for each of the cars. Columns 483 (labeled "CModel") and 485 (labeled "CYear") specify the model and year of making corresponding to each of the cars. Columns 487 (labeled "CMfgRef") and 488 (labeled "CEngRef") indicate the manufacturer and the engine for each car by specifying the reference identifiers of the corresponding manufacturer and engine.

Each of rows 491-494 specifies information about a car. In particular, row 491 specifies a car of model "M1" (as shown in column 483) made in the year "2002" (as shown in column 485) and having a reference identifier "31" (as shown in column 482). The car in row 491 is manufactured by "XYZ MOTORS" (corresponding to the row with "REFID" equal to "11" as specified by column 487) and has an engine "FASTT" (corresponding to the row with "REFID" equal to "23" as specified in column 488). Similarly other rows specify information about other cars.

Each application 310A-310C may access the data of interest from the data described above by sending requests directed to navigational database 380. The description is continued illustrating the manner in which portions of code (contained in a single/multiple applications) access data from a source system thereby populating a cache. The manner in which the data maintained in the cache can be accessed by various user applications according to various aspects of the present invention is described then.

6. Populating Cache

Figure 5A:
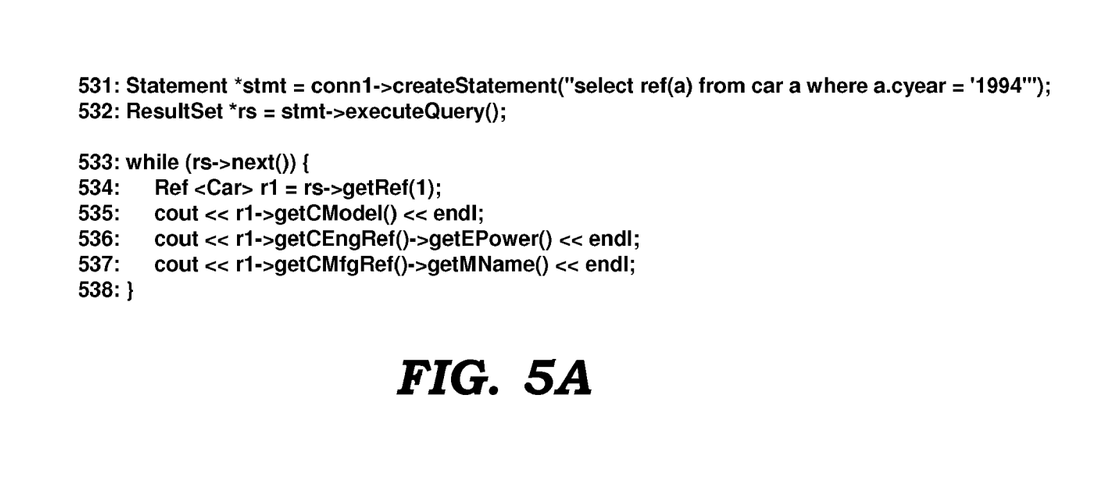
Figure 5B:
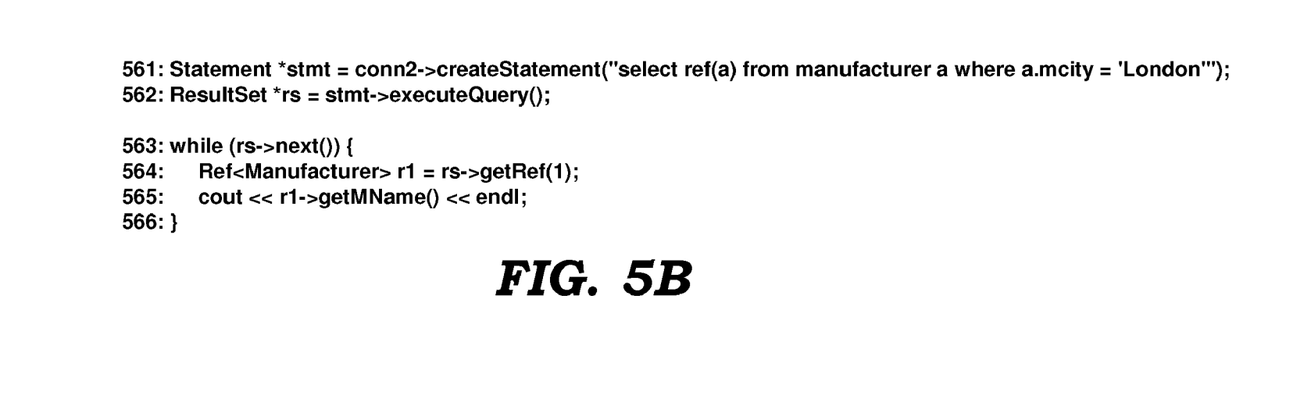

Each of FIGS. 5A and 5B depicts a portion of software code (contained in application 310A), which on execution accesses data from a source system thereby populating the cache in one embodiment. Though the portions of code are shown encoded in "C++" language, it should be appreciated that the features can be implemented in other environments and programming languages as well.

Referring to FIG. 5A, lines 531-538 depict software instructions contained in application 310A, which on execution accesses data from navigational database 380 by using pre-define functions (such as "createStatement", "executeQuery", etc.) provided by client interface 330.

In line 531, a variable "stmt" is created using a connection with identifier "conn1" and a query represented by the string "select ref(a) from car a where a.cyear='1994'". The connection "conn1" may be established/destroyed using appropriate functions (not shown) provided by client interface 330.

The query in line 531 specifies a condition "a.cyear='1994'" and an indication "ref(a)" indicating that only the reference identifiers of rows in the table "car" (table 470) whose value in column "cyear" (column 485) is equal to "1994" be included in the response to the query. In other words, the query indicates that the data of interest is information about cars made in "1994".

In line 532, the query is executed and the result of execution is stored in the result set "rs". On execution of line 532, a request containing the query specified in line 531 is sent to navigational database 380 (as identified by the connection "conn1" during the creation of the "stmt" variable). Navigational database 380 may then process the request to identify the result set {33, 34} indicating the reference identifiers of the data elements (rows 493 and 494 respectively) matching the query. The result set is then sent as a response to the request. Thus, after execution, the variable "rs" indicates the result set {33, 34}.

Lines 533-538 depict a set of instructions executed for each identifier in the result set "rs". The identifiers in the result set are processed in a sequential manner (assuming that the identifiers are provided in ascending order for convenience) with line 533 determining the presence of the subsequent identifier (indicated by "rs→next( )") to be processed. As such, lines 534-537 are executed only in the scenario that a subsequent identifier is determined to be present in line 533.

In line 534, the subsequent reference identifier determined in line 533 is retrieved and stored in the variable "r1". In line 535, the model of the car specified by the reference identifier stored in variable "r1" (as indicated by "r1→getCModel( )") is displayed. On execution of line 535, a request for retrieving the row corresponding to the reference identifier stored in variable "r1" is sent to navigational database 380. On receiving the row information in response from navigational database 380, the data corresponding to the column "CModel" (column 483) is displayed.

In line 535, the power of the engine used in the car identified by "r1" is displayed. It may be observed that to display the power of the engine used in the car, the reference identifier of the engine associated with the car is first accessed and then the power of the engine is accessed (as indicated by "r1→getCEngRef( )→getEPower( )").

Thus, on execution of line 535, a request for accessing the row having a reference identifier indicated by "r1→getCEngRef( )" is sent to navigational database 380. On receiving the row in response, the data corresponding to the column "EPower" (column 455) is displayed.

Similarly, in line 537, the name of the manufacturer of the car is displayed by first sending a request for a row having the reference identifier indicated by "r1→getMfgRef( )", receiving the row in response and then displaying the data in column "MName" (column 324).

Lines 533-538 are executed twice corresponding to the two identifiers in the result set {33, 34}. During the first iteration, the variable "r1" is set to "33" in line 534. In line 535, the data element (row 493) corresponding to the reference identifier "33" is retrieved and the data "M3" corresponding to column "CModel" is displayed.

In line 535, the reference identifier "22" corresponding to column "CEngRef" is used for retrieving the corresponding data element (row 462) from the table of engines (table 440), and the data "1.5" corresponding to column "EPower" is displayed.

Similarly, in line 537, the reference identifier "13" corresponding to column "CMfgRef" is used for retrieving the corresponding data element (row 433) from the table of manufacturers (table 410), and the data "TECH CARS" corresponding to column "MName" is displayed.

It may be observed that during the first iteration, the data in rows 493, 462, 433 identified by the reference identifiers "33", "22" and "13" are retrieved from navigational database 380. During the second iteration, where variable "r1" is set to "34", the data in rows 494, 463 and 431 are retrieved similar to the first iteration.

Referring to FIG. 5B, lines 561-565 depict another set of software instructions contained in application 310A, which on execution accesses data from navigational database 380. Lines 561-565 are similar to line 531-538, except that a different condition is specified, and are not described in detail for conciseness.

In line 561, a statement using the connection "conn2" and the query "select ref(a) from manufacturer a where a.mcity='London'" is created, with the query specifying that the reference identifiers of the manufacturers located in the city of "London" be sent in response to the query. As such, during the execution of line 562, the result set {11} corresponding to data element (row 431) matching the query is sent as the response by navigational database 380.

Lines 563-565 are executed only once corresponding to the single identifier "11". In Line 564, the variable "r1" is set to the reference identifier "11". In line 565, a request for the row identified by reference identifier "11" is sent to navigational database 380, and on receiving a corresponding response, the data "XYZ MOTORS" corresponding to the column "MName" (column 424) is displayed.

It may be appreciated that cache 150 may maintain copies of the data elements (rows) retrieved during the execution of the portions of code depicted in FIGS. 5A and 5B. The cache may be partitioned based on connections and as such the copies of the data elements may be maintained associated with the connections on which the data elements were received. The manner in which cache 150 maintains copies of data is described below with examples.

7. Maintaining Copies of Data

Figure 6A:
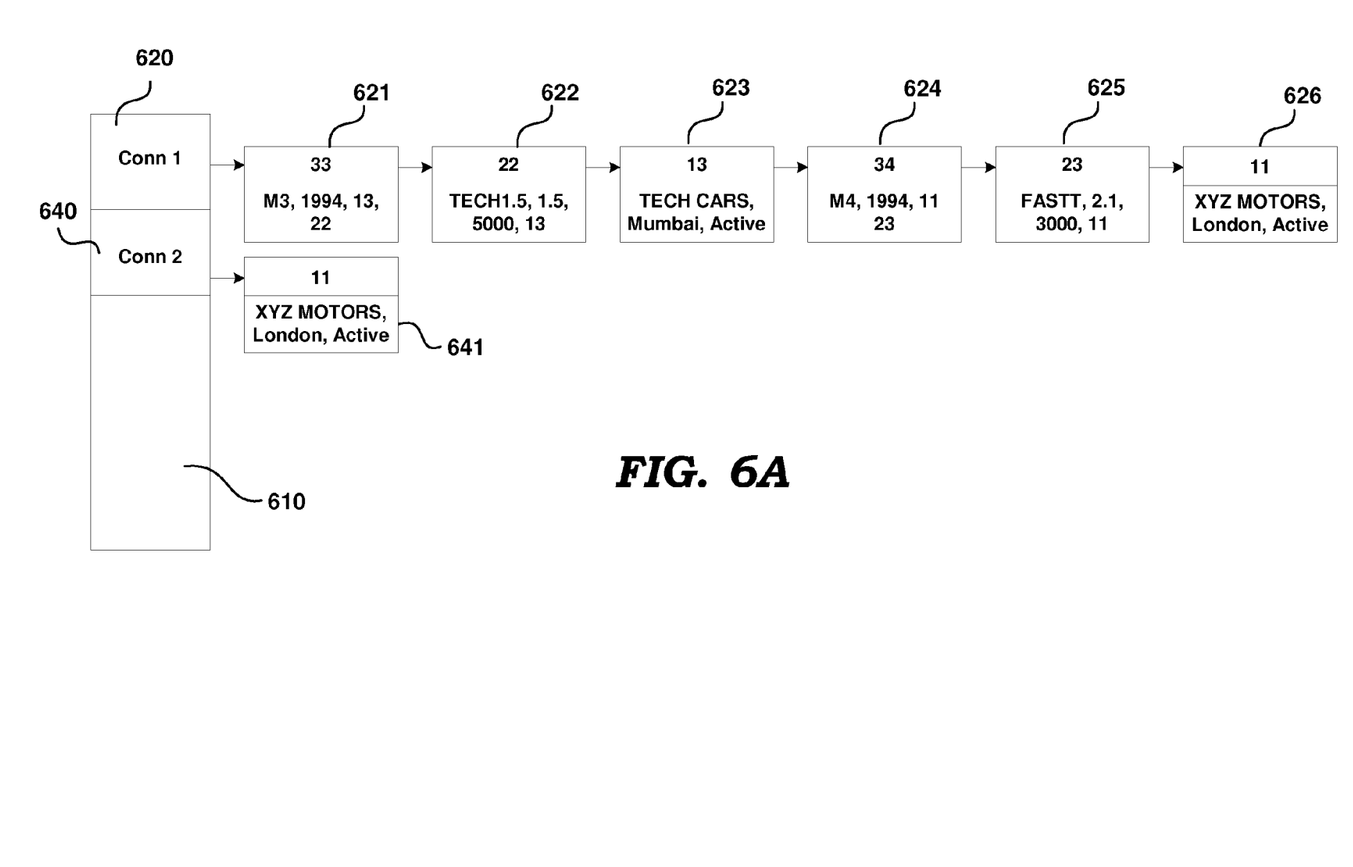
FIG. 6A is a block diagram depicting the manner in which a cache maintains copies of data partitioned based on connections in one embodiment.

FIG. 6A is a block diagram depicting the manner in which a cache maintains copies of data partitioned based on connections in one embodiment. The block diagram is shown containing connection table 610 (containing connection elements 620 and 640) and data blocks 621-626 and 641. Each block is briefly described below.

Connection table 610 represents a data structure maintaining information about the various connections used for requesting data from a source system (such as navigational database 380). Each of connection elements 620 and 640 contains an identifier of the connection ("conn1" and "conn2" respectively) associated with a linked list of copies of data. The connection identifier may in turn further specify the specific application establishing the connection.

Connection element 620 ("conn1") is shown associated with a linked list containing data blocks 621-626. Each of data blocks 621-626 and 641 contains a copy of a row (data element) in a table and is shown with the reference identifier of the row in the upper portion and the data contained in the other columns of the row in the lower portion. Though the data blocks are shown as containing only the copies of the row, it may be appreciated that other information such as the table to which the row belongs, a flag indicating that the data has been modified, etc., may also be maintained in the data blocks.

It may be observed that data blocks 621-626 correspond to copies of rows 493, 462, 433, 494, 463 and 431 (with reference identifiers 33, 22, 13, 34, 23 and 11 as shown in the respective upper portions of the data blocks) retrieved during the execution of the portion of code depicted in FIG. 5A. Similarly, connection element 640 ("conn2") is shown associated with a linked list containing data block 641, retrieved during the execution of the portion of code depicted in FIG. 5B.

It may be further observed that data block 641 is similar to data block 626. As such, cache 350 on intercepting a request for a row identified by reference identifier "11" using connection "conn2", did not use data block 626 in generating a response to the request.

On the other hand, cache 350 may have indicated that the row (with reference identifier "11") was not available in the cache, thereby making client interface 330 forward the request to navigational database 380. On receiving a response from navigational database 380 containing the requested data element (forwarded by client interface 330), a copy of the data element (data block 641) was maintained associated with connection "conn2".

It may be appreciated that frequent use of the cache by different connections (or portions of code) over a period of time may create a scenario where a large number of rows are made available in cache 350. It may then be desirable to provide direct access to cache 350, thereby enabling the results of queries/aggregation/sorting to be determined without sending requests to the source system. The manner in which direct access to copies of data maintained in cache is provided is described below with examples.

8. Accessing Copies of Data Maintained in Cache

Figure 6B:
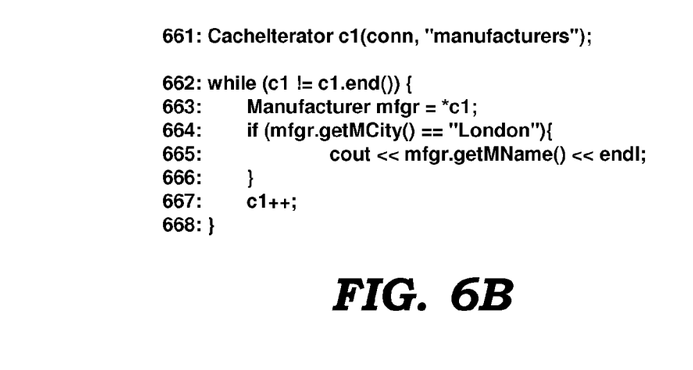
FIG. 6B depicts a portion of the code, which on execution directly accesses data stored in a cache in one embodiment.

FIG. 6B depicts a portion of the code, which on execution directly accesses data stored in a cache in one embodiment. In one embodiment, access to data stored in a cache is provided using an iterator defined in compliance with C++ Standard Template Library (STL) described in more detail in a document entitled "ISO/IEC International Standard, Programming Languages—C++" with reference number ISO/IEC 14882:1998(E) and also in the book titled "The C++ Programming Language" by Bjarne Stroustroup with ISBN number 0201700735.

Broadly, iterators enable accessing a set of data elements in a sequential manner. Generally iterators provide operations such as accessing the next data element, checking whether all the data elements in the set have been accessed, etc.

Lines 661-668 depict a portion of code, which on execution enables direct access of data stored in a cache. In line 661, a new cache iterator "c1" is created for accessing copies of rows retrieved from the "manufacturers" table (table 310) using connection "conn1". It should be appreciated that data corresponding all connections (established by the application) may be retrieved by not specifying the connection identifier.

On execution of line 661, a set of data elements containing data blocks 623 and 626 (corresponding to the copies of the rows retrieved from the "manufacturers" table using connection "conn1") is created and cache iterator "c1" is initialized to refer to the first data element in the set.

Lines 662-668 depict a set of instructions executed for each data element in the set of data elements. The data elements in the set are processed in a sequential manner (assuming for convenience that the data elements are provided in the order in which the data blocks occur in the linked list) with line 662 determining whether the "c1" refers to the end of the set (using "c1.end( )"). As such, lines 663-667 are executed only in the scenario that "c1" does not refer to the end of the set in line 662.

In line 663, the copy of data referred by "c1" is retrieved and stored in variable "mfgr". Line 664 on execution determines whether the location of the manufacturer "mfgr.getMCity( )" is equal to "London". In the scenario that the location of the manufacturer is determined to be equal to "London", lines 665-666 are executed, wherein, the name of the manufacturer (as indicated by "mfgr.getMName( )") is displayed. In line 667, the iterator "c1" is incremented, that is, the iterator is made to refer to the next data element in the set.

Lines 662-668 are executed twice corresponding to the two elements in the set of data elements (containing data blocks 623 and 626). During the first iteration, the variable "mfgr" contains the data from data block 623 (since "c1" is initialized to refer to the first data element in the set in line 661). Lines 665-666 is not executed since the location of the manufacturer "Mumbai" is determined not be equal to "London" in line 664. In line 667, the iterator "c1" is incremented to refer to the next data element (data block 626).

During the second iteration, the variable "mfgr" contains the data from data block 626, and lines 665-666 is executed since the location of the manufacturer "London" is determined to be equal to "London" in line 664. On execution of lines 665-666, the name of the manufacturer "XYZ MOTORS" is displayed. In line 667, the iterator "c1" is incremented to refer to the end of the set (since there are no more data elements in the set).

It may be appreciated that the data of interest retrieved on execution of the portions of code depicted in FIGS. 4B and 6B are similar to each other. Thus, by executing the portion of code depicted in FIG. 6B, requests to a source system for accessing the data elements of interest may be reduced.

Such a feature would be of particular relevance when an application has previously issued queries, which would have caused all the data (with possible more elements) elements of interest to be populated in cache 350.

In an alternative embodiment, the reference identifiers received in response to a query may then be sent in the form of one or more requests directed to the cache to retrieve the specific corresponding data elements available in the cache. Such a feature would be useful if each data element contains a large amount of data and retrieval from external source systems would be substantial overhead.

The description is continued with respect to an example implementation of cache 150.

9. Cache

Figure 7:
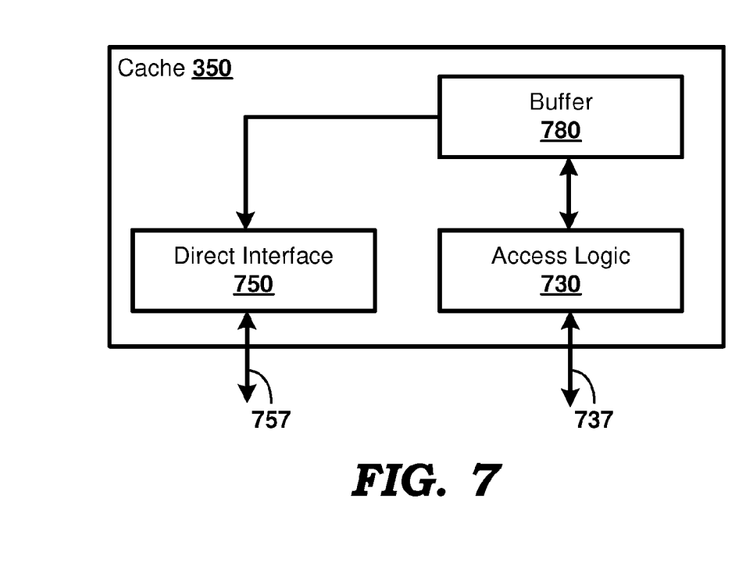
FIG. 7 is a block diagram illustrating details of cache 350 in an embodiment.

FIG. 7 is a block diagram illustrating details of cache 350 in an embodiment. The block diagram is shown containing access logic 730, direct interface 750, and buffer 780. Each block is described briefly below.

Buffer 780 represents a portion of cache 350 storing copies of data. The data may be received in response to requests from accessing components (such as applications 310A-310C) directed to a source system (such as navigational database 380). In an embodiment, buffer 780 represents a volatile memory (e.g., a RAM).

Access logic 730 represents software instructions, which on execution, intercepts (via path 737) requests for data elements (rows) from applications 310A-310C directed to a source system (such as navigational database 380). Access logic 730 then determines whether copies of requested data elements are contained in buffer 780 by checking whether reference identifiers corresponding to the requested data elements are available in a partition associated with the connection on which the requests are being made.

In the scenario that buffer 780 contain copies of requested data, access logic 730 may send a response to the request including the copies of the requested data. Alternatively, access logic 730 may send an indication to client interface 330 (via path 737) indicating that copies of the requested data are available in cache 350. On receiving such an indication, client interface 330 may send a response (containing the copies of the requested data maintained in buffer 780) to the requesting application.

In the scenario that the requested data is not available in buffer 780, access logic 730 may send a corresponding indication to client interface 330. On receiving an indication indicating that the requested data is not available in cache 350, client interface 330 may forward the requests to navigational database 380. Access logic 730 may then receive the response containing the requested data elements (forwarded by client interface 330) and store a copy of the data elements in buffer 780.

Access logic 730 may also update partition information (not shown) indicating the specific connection/application, which caused the corresponding data elements to be populated in buffer 780. In one embodiment, partition information is also stored in buffer 780.

Direct interface 750 receives requests for copies of data from each application 310A-310C (via path 757). Direct interface 750 retrieves the requested copies from buffer 780 and sends them as a response to the request (via path 757). It may be appreciated that the same copies of data may be accessed through either access logic 730 or direct interface 750.

While the description is provided substantially with respect to FIG. 3 above, it should be appreciated that many of the features (and related description) are applicable to FIG. 1 as well. The description is not repeated merely in the interest of conciseness.

It may be appreciated that though the requests directed to the source system and the requests direct to cache are shown as being processed by access logic 730 and direct interface 780, in alternative embodiments, access logic 730 and direct interface 780 may be combined into a single cache logic designed to handle the requests directed to both the source system and the cache.

Furthermore, though the partition description is provided assuming the data elements maintained in the cache are partitioned based on connections, it should be appreciated that the partition inherently supports partitions based on applications (since each connection is assumed to be not shared by multiple applications).

Accordingly, alternative embodiment can be implemented which facilitate applications to request for data elements in partitions populated by other applications as well, as will be apparent to one skilled in the relevant arts. Many such implementations are contemplated to be covered by several aspects of the present invention.

It should be appreciated that the features described above can be implemented in various embodiments as a desired combination of one or more of hardware, software and firmware. The description is continued with respect to an embodiment in which various features are operative when software instructions are executed.

10. Digital Processing System

Figure 8:
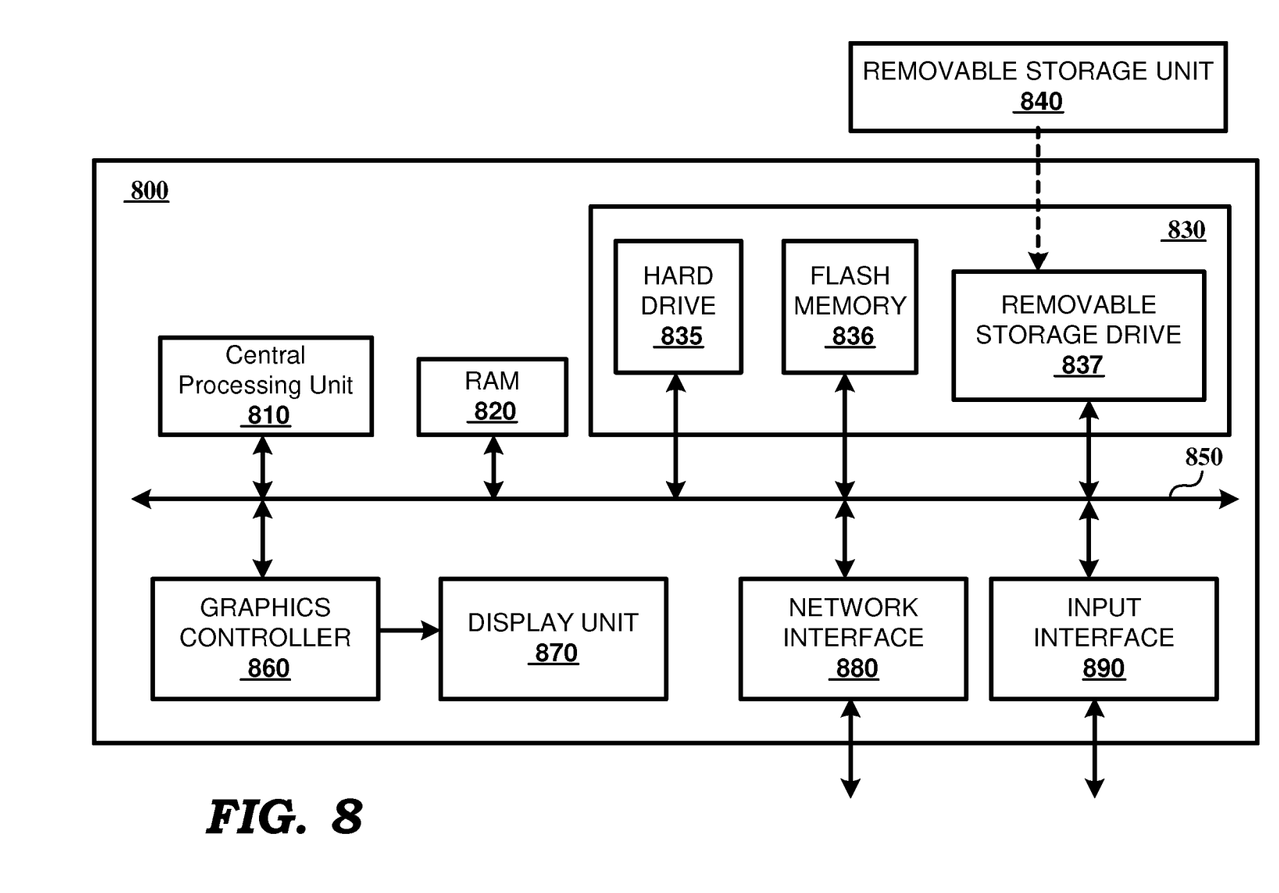
FIG. 8 is a block diagram illustrating the details of a digital processing system in which various aspects of the present invention are operative by execution of appropriate software instructions.

FIG. 8 is a block diagram illustrating the details of digital processing system 800 in which various aspects of the present invention are operative by execution of appropriate software instructions. Digital processing system 800 may correspond to client system 130 (executing application 170 and containing cache 150), a system executing each application 310A-310C or a system implementing client interface 330 and cache 350.

Digital processing system 800 may contain one or more processors (such as a central processing unit (CPU) 810), random access memory (RAM) 820, secondary memory 830, graphics controller 850, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present invention. CPU 810 may contain multiple processing units, with each processing unit potentially being designed for a specific task. Alternatively, CPU 810 may contain only a single general-purpose processing unit. RAM 820 may receive instructions from secondary memory 830 using communication path 850.

Graphics controller 850 generates display signals (e.g., in RGB format) to display unit 870 based on data/instructions received from CPU 810. Display unit 870 contains a display screen to display the images defined by the display signals. Input interface 890 may correspond to a keyboard and a pointing device (e.g., touch-pad, mouse). Network interface 880 provides connectivity to a network (e.g., using Internet Protocol), and may be used to communicate with other connected systems (such as source systems 110A-110C) of FIG. 1.

Secondary memory 830 may contain hard drive 835, flash memory 835, and removable storage drive 837. Secondary memory 830 may store the data (e.g., data depicted in FIG. 6A) and software instructions (e.g., code portions depicted in FIGS. 5A, 5B and 6B), which enable digital processing system 800 to provide several features in accordance with the present invention.

Some or all of the data and instructions may be provided on removable storage unit 840, and the data and instructions may be read and provided by removable storage drive 837 to CPU 810. Floppy drive, magnetic tape drive, CD-ROM drive, DVD Drive, Flash memory, removable memory chip (PCMCIA Card, EPROM) are examples of such removable storage drive 837.

Removable storage unit 840 may be implemented using medium and storage format compatible with removable storage drive 837 such that removable storage drive 837 can read the data and instructions. Thus, removable storage unit 840 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present invention described above.

11. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of providing access to a plurality of data elements stored in a source system, said method comprising:

sending from a user application a plurality of requests directed to said source system by having an address of said source system specified as the target of each request, wherein said plurality of requests are sent based on execution of a first set of instructions constituting a part of said user application;

populating a cache with a copy of said plurality of data elements based on examination of said plurality of requests, sending from said user application a first request for a copy of a data element, said first request being directed to said cache by having an address of said cache specified as the target of said first request, wherein said data element is contained in said plurality of data elements and said first request is sent by executing a second set of instructions forming another part of said user application;

receiving, by said cache, said first request directed to said cache for said copy of said data element, sending by said cache to said user application, said copy of said data element in said cache as a first response to said first request directed to said cache;

intercepting, by said cache, a second request directed to said source system for said data element, said second request being directed to said source system by having the address of said source system as the target; and sending said copy of said data element as a second response to said second request.

2. The method of claim 1, wherein each of said address of said source system and said cache is an Internet Protocol (IP) address and wherein said user application is implemented in a same single client system having said IP address of said cache.

3. The method of claim 2, further comprising:
receiving a fourth request directed to said cache for accessing copies of a set of data elements, wherein said set of data elements is contained in said plurality of data elements; and
providing said copies of said set of data elements as a fourth response to said fourth request.

4. The method of claim 3, wherein said providing provides said copies of said set of data elements in a sequential manner, said providing further comprising:
sending a copy of a first data element contained in said set of data elements;
receiving a request to access a copy of a next data element contained in said set of data elements; and
sending a copy of said next data element if a last data element of said set of data elements is not yet sent.

5. The method of claim 3, further comprising sending an indication indicating that the copies of all the data elements contained in said set of data elements has been accessed, if said last data element has already been sent.

6. The method of claim 1, wherein said plurality of requests, said first request and said second request are received by said cache on a first connection, whereby said second response is sent in view of having received on the same connection as on which the request causing the cache to be populated is also received,
wherein said first connection is contained in a plurality of connections established between applications and said source system to facilitate access of said plurality of data elements, said method further comprising:
intercepting a third request directed to said source system for a second data element contained in said plurality of data elements stored in said cache, wherein said third request is received on a second connection contained in said plurality of connections; and
not sending a copy of said second data element contained in said cache as a response to said third request in view of having received said third request on a different connection compared to the request causing the cache to be populated.

7. The method of claim 6, further comprising:
maintaining a partition information indicating the specific connection in said plurality of connections which caused the corresponding data element to be populated in said cache, wherein said partition information indicates that said first connection caused said copy of said second data element to be stored in said cache;
examining said partition information to determine whether said second data element is populated in response to requests received on said second connection, wherein it is determined to not send said copy of said second data element contained in said cache as said third response in view of said partition information indicating that said second data element is populated in response to requests received on said first connection.

8. The method of claim 7, wherein said first connection and said second connection are established between said user application and said source system,
wherein each request directed to said cache contains an identifier of a connection associated the data item sought to be retrieved from said cache,
wherein the requested data item is sent in corresponding response only if the partition information indicates that the requested data item has been populated based on requests received on the same connection as that identified by said identifier associated with the requested data item;
wherein said first request directed to said cache contains a first identifier of said first connection thereby causing said copy of said data element to be sent as a response by said cache.

9. The method of claim 7, wherein said first connection is established between said user application and said source system and said second connection is established between a second application and said source system.

10. The method of claim 7, wherein said source system comprises a database system and each of said plurality of data elements comprises a row in a table of said database system.

11. The method of claim 1, further comprising:
intercepting a third request directed to said source system from said second application for a second data element contained in said plurality of data elements; and
not sending a copy of said second data element contained in said cache as a response to said third request in view of said third request being received from a different application compared to the application that caused said second data element to be populated in said cache.

12. The method of claim 11, further comprising:
maintaining a partition information indicating the specific application which caused the corresponding data element to be populated in said cache, wherein said partition information indicates that said user application caused said copy of said second data element to be stored in said cache; and
examining said partition information to determine to not send said copy of said second data element in said cache as said response to said third request.

13. A computer readable medium storing one or more sequences of instructions for causing a client system to access data elements stored in a source system, wherein execution of said one or more sequences of instructions by one or more processors contained in said client system causes said client system to perform the actions of:
sending from a user application a plurality of requests directed to said source system by having an address of said source system specified as the target of each request, wherein said plurality of requests are sent based on execution of a first set of instructions constituting a part of said user application;
receiving corresponding responses in said user application, wherein said plurality of requests cause a cache to be populated with a copy of a plurality of data elements,
wherein said cache is implemented external to said source system and stores a copy of said plurality of data elements locally;
sending from said user application a first request for a copy of a first data element, said first request being directed to said cache by having an address of said cache specified as the target of said first request, wherein said first request is sent based on execution of a second set of instructions constituting another part of said user application, wherein said first data element is contained in said plurality of data elements; and
receiving in said user application from said cache, a copy of said first data element as a first response to said first request.

14. The computer readable medium of claim 13, further comprising one of more instructions for:

sending from said user application, a second request for said first data element directed to said source system by having an address of said source system specified as the target of said second request; and receiving in said user application from said cache, said copy of said first data element as a second response to said second request.

15. The computer readable medium of claim 14, wherein said source system is a database system which stores data elements in tables in the form of rows, wherein said plurality of requests, said first request and said second request are sent on a first connection, wherein said first connection is contained in a plurality of connections established between said client system and said database system to facilitate access of said plurality of data elements, further comprising one or more instructions for:

sending a third request directed to said database system for a second data element contained in said plurality of data elements, wherein said third request is sent on a second connection contained in said plurality of connections; and not receiving a copy of said second data element contained in said cache as a response to said third request, wherein said second data element is received from said database system as said response to said third request.

16. A computing system comprising:

a source system to store a plurality of data elements; and a client system to execute an application, said client system also comprising a cache, said user application operable to:

send a plurality of requests directed to said source system by having an address of said source system specified as the target of each request, and receive corresponding responses in said application, wherein said plurality of requests cause said cache to be populated with a copy of a plurality of data elements, wherein said cache is implemented external to said database system and stores a copy of said plurality of data elements locally;

send a first request for a copy of a first data element, said first request being directed to said cache by having an address of said cache specified as the target of said first request, wherein said first data element is contained in said plurality of data elements; and receive from said cache, a copy of said first data element as a first response to said first request;

said cache comprising:

a volatile memory to store a copy of said plurality of data elements; and a cache logic to receive said first request and to send said copy of said data element in said volatile memory as a first response to said first request.

17. The computing system of claim 16, wherein said cache logic further comprises:

an access logic to store said copy of said plurality of data elements in said volatile memory on receiving said plurality of data elements in response to said plurality of requests directed to said source system, wherein said access logic is also designed to intercept a second request directed to said source system for said data element and to send said copy of said data element as a second response to said second request.

18. The computing system of claim 17, wherein said plurality of requests and said second request are received from said user application, wherein said access logic intercepts a third request directed to said source system from a second application for a second data element contained in said plurality of data elements and does not send a copy of said second data element contained in said volatile memory as a response to said third request in view of said third request being received from an application different from the application causing said second data element to be populated in said cache.

19. The computing system of claim 18, wherein said access logic maintains a partition information indicating the specific application which caused the corresponding data element to be populated in said volatile memory, wherein said partition information indicates that said user application caused said copy of said second data element to be stored in said volatile memory, wherein said access logic examines said partition information to determine to not send said copy of said second data element in said volatile memory as said response to said third request.

20. A computing system comprising:

a database system containing a plurality of tables together storing a plurality of data elements as respective rows;

a cache to first receive a plurality of requests for a subset of data elements contained in said plurality of data elements, each of said plurality of requests being directed to said database system by having the address of the database specified as the target of the request, said cache to maintain a copy of said subset of data elements in response to examining said plurality of requests; and a client system to execute a first user application which is operable to:

send said plurality of requests and receive said subset of data elements as corresponding responses;

retrieve said subset of data elements by sending requests directed to said cache by having an address of said cache specified as the target of each request.

21. The computing system of claim 20, wherein said first user application executing in a run time environment of said client system sends a query indicating a condition to said database system and receives a plurality of reference identifiers in response, wherein each reference identifier identifies a corresponding data element matching said condition, said first user application sending a first set of requests directed to said database system to retrieve a first set of data elements corresponding to said plurality of reference identifiers, wherein said cache is populated with a copy of said first set of data elements on receiving responses corresponding to said first set of requests from said database system.

22. The computing system of claim 21, wherein a second application executing in said run time environment of said client system sends a second set of requests directed to said cache to retrieve said copy of said first set of data elements from said cache.

23. A method of allowing access to data elements stored in a source system, said method being performed in a client system, said method comprising:

sending from a user application a plurality of requests directed to said source system by having an address of said source system specified as the target of each request, wherein said plurality of requests are sent based on execution of a first set of instructions constituting a part of said user application;

receiving corresponding responses in said user application, wherein said plurality of requests cause a cache to be populated with a copy of a plurality of data elements, wherein said cache is implemented external to said source system and stores a copy of said plurality of data elements locally;

sending from said user application a first request for a copy of a first data element, said first request being directed to said cache by having an address of said cache specified as the target of said first request, wherein said first request is sent based on execution of a second set of instructions constituting another part of said user application, wherein said first data element is contained in said plurality of data elements; and receiving in said user application from said cache, a copy of said first data element as a first response to said first request.

24. The method of claim 23, further comprising one of more instructions for:

sending from said user application, a second request for said first data element directed to said source system by having an address of said source system specified as the target of said second request; and receiving in said user application from said cache, said copy of said first data element as a second response to said second request.

25. The method of claim 24, wherein said source system is a database system which stores data elements in tables in the form of rows, wherein said plurality of requests, said first request and said second request are sent on a first connection, wherein said first connection is contained in a plurality of connections established between said client system and said database system to facilitate access of said plurality of data elements, further comprising one or more instructions for:

sending a third request directed to said database system for a second data element contained in said plurality of data elements, wherein said third request is sent on a second connection contained in said plurality of connections; and not receiving a copy of said second data element contained in said cache as a response to said third request, wherein said second data element is received from said database system as said response to said third request.

* * * * *